United States Patent
Ma et al.

(10) Patent No.: US 10,722,792 B2
(45) Date of Patent: Jul. 28, 2020

(54) VIRTUAL IMAGE INTERACTION METHOD, VIRTUALIZATION DEVICE AND AUGMENTED REALITY SYSTEM

(71) Applicant: BOE TECHNOLOGY GROUP CO., LTD., Beijing (CN)

(72) Inventors: Xitong Ma, Beijing (CN); Naifu Wu, Beijing (CN); Tianyue Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/178,216

(22) Filed: Nov. 1, 2018

(65) Prior Publication Data
US 2019/0299095 A1    Oct. 3, 2019

(30) Foreign Application Priority Data
Mar. 29, 2018    (CN) .......................... 2018 1 0270094

(51) Int. Cl.
| | |
|---|---|
| *A63F 13/426* | (2014.01) |
| *A63F 13/56* | (2014.01) |
| *A63F 3/00* | (2006.01) |
| *A63F 3/02* | (2006.01) |
| *G06F 3/14* | (2006.01) |
| *G06F 3/0484* | (2013.01) |

(52) U.S. Cl.
CPC ........ *A63F 13/426* (2014.09); *A63F 3/00643* (2013.01); *A63F 3/02* (2013.01); *A63F 13/56* (2014.09); *G06F 3/04845* (2013.01); *G06F 3/1454* (2013.01); *A63F 2003/00996* (2013.01); *A63F 2300/64* (2013.01)

(58) Field of Classification Search
None
See application file for complete search history.

(56) References Cited

U.S. PATENT DOCUMENTS

| | | | |
|---|---|---|---|
| 2014/0036501 A1* | 2/2014 | Takano | ..................... F21V 5/04 362/244 |
| 2018/0172990 A1* | 6/2018 | Fujita | ................. G02B 27/0101 |
| 2019/0025582 A1* | 1/2019 | Morohashi | ............. B60K 35/00 |

* cited by examiner

*Primary Examiner* — Ronald Laneau
(74) *Attorney, Agent, or Firm* — Kinney & Lange, P.A.

(57) ABSTRACT

A virtual image interaction method and relevant devices are disclosed. The virtual image interaction method for use in a master virtualization device includes: projecting a first virtual image to a first predetermined position, and transmitting projection data for projection of the first virtual image to a slave virtualization device; acquiring an operational instruction for the first virtual image; updating the first virtual image in accordance with the operational instruction, to acquire a second virtual image; and projecting the second virtual image to the first predetermined position, and transmitting projection data for projection of the second virtual image to the slave virtualization device.

18 Claims, 4 Drawing Sheets

---

11 — projecting, by a master virtualization device, a first virtual image to a first predetermined position, and transmitting projection data for projection of the first virtual image to a slave virtualization device 12 — acquiring, by the master virtualization device, an operational instruction for the first virtual image 13 — updating, by the master virtualization device, the first virtual image in accordance with the operational instruction to acquire a second virtual image 14 — projecting, by the master virtualization device, the second virtual image to the first predetermined position, and transmitting projection data for projection of the second virtual image to the slave virtualization device acquiring, by a slave virtualization device, projection data for projection of a first virtual image from a master virtualization device, and projecting the first virtual image to a second predetermined position in accordance with the projection data for projection of the first virtual image /31 acquiring, by the slave virtualization device, projection data for projection of a second virtual image from the master virtualization device, and projecting the second virtual image to the second predetermined position in accordance with the projection data for projection of the second virtual image /32

Fig.3

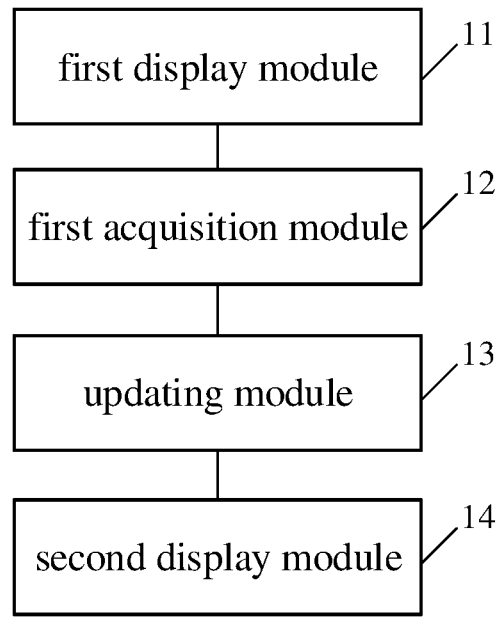

Fig.4

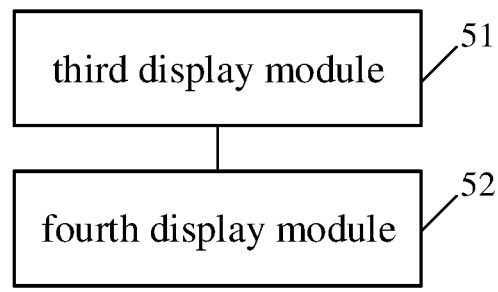

Fig.5

VIRTUAL IMAGE INTERACTION METHOD, VIRTUALIZATION DEVICE AND AUGMENTED REALITY SYSTEM

CROSS-REFERENCE TO RELATED APPLICATION

The present application claims a priority of the Chinese patent application No. 201810270094.2 filed on Mar. 29, 2018, which is incorporated herein by reference in its entirety.

TECHNICAL FIELD

The present disclosure relates to the field of augmented reality (AR) technology, in particular to a virtual image interaction method, a virtualization device and an AR system.

BACKGROUND

Along with the development of AR technology, AR devices have become more and more popular in the market. In related art, an AR device is merely capable of projecting a virtual image for one user and capturing an action of the user in conjunction with the virtual image, so relevant software applications are stand-alone without any interactivity.

Currently, a personal AR terminal is still a niche product. It is very important to provide an imaginative interactive application for the promotion of AR products.

SUMMARY

An object of the present disclosure is to provide a virtual image interaction method and relevant devices.

In one aspect, the present disclosure provides in some embodiments a virtual image interaction method for use in a master virtualization device, including: projecting a first virtual image to a first predetermined position, and transmitting projection data for projection of the first virtual image to a slave virtualization device; acquiring an operational instruction for the first virtual image; updating the first virtual image in accordance with the operational instruction, to acquire a second virtual image; and projecting the second virtual image to the first predetermined position, and transmitting projection data for projection of the second virtual image to the slave virtualization device.

In a possible embodiment of the present disclosure, the acquiring the operational instruction for the first virtualization image includes at least one of: identifying an operational instruction given by a first user with respect to the first virtual image; or acquiring an operational instruction transmitted by the slave virtualization device and given by a second user with respect to the first virtual image. The first user is a user of the master virtualization device, and the second user is a user of the slave virtualization device.

In a possible embodiment of the present disclosure, the first virtual image includes a predetermined region. The identifying the operational instruction given by the first user with respect to the first virtual image includes: acquiring displacement information about an object in the first virtual image moved by the first user; when the displacement information indicates that the first user has moved the object from a position outside the predetermined region to another position within the predetermined region, determining that the first user has given an object addition instruction with respect to the predetermined region; when the displacement information indicates that the first user has moved the object from a position within the predetermined region to another position outside the predetermined region, determining that the first user has given an object cancellation instruction with respect to the predetermined region; and when the displacement information indicates that the first user has moved the object from a position within the predetermined region to another position within the predetermined region, determining that the first user has given an object movement instruction with respect to the predetermined region.

In a possible embodiment of the present disclosure, the displacement information includes initial coordinate values and final coordinate values of the object relative to the predetermined region during the movement of the object by the first user.

In a possible embodiment of the present disclosure, a virtual chess board is formed at an entirety of the predetermined region, the object is a virtual chess piece, and the position is a point to which the virtual chess piece is capable of moving.

In another aspect, the present disclosure provides in some embodiments a virtual image interaction method for use in a slave virtualization device, including: acquiring projection data that is for projection of a first virtual image and transmitted from a master virtualization device, and projecting the first virtual image to a second predetermined position in accordance with the projection data for the projection of the first virtual image; and acquiring projection data that is for projection of a second virtual image and transmitted from the master virtualization device, and projecting the second virtual image to the second predetermined position in accordance with the projection data for the projection of the second virtual image. The second virtual image is acquired by the master virtualization device through updating the first virtual image in accordance with an operational instruction for the first virtual image.

In a possible embodiment of the present disclosure, the virtual image interaction method further includes: identifying an operational instruction given by a second user with respect to the first virtual image; and transmitting, to the master virtualization device, the operational instruction that is for the first virtual image and given by the second user. The second user is a user of the slave virtualization device.

In a possible embodiment of the present disclosure, the first virtual image includes a predetermined region. The identifying the operational instruction given by the second user with respect to the first virtual image includes: acquiring displacement information about an object in the first virtual image moved by the second user; when the displacement information indicates that the second user has moved the object from a position outside the predetermined region to another position within the predetermined region, determining that the second user has given an object addition instruction with respect to the predetermined region; when the displacement information indicates that the second user has moved the object from the position within the predetermined region to another position outside the predetermined region, determining that the second user has given an object cancellation instruction with respect to the predetermined region; and when the displacement information indicates that the second user has moved the object from a position within the predetermined region to another position within the predetermined region, determining that the second user has given an object movement instruction with respect to the predetermined region.

In a possible embodiment of the present disclosure, the displacement information includes initial coordinate values and final coordinate values of the object relative to the predetermined region during the movement of the object by the second user.

In a possible embodiment of the present disclosure, a virtual chess board is formed at an entirety of the predetermined region, the object is a virtual chess piece, and the position is a point to which the virtual chess piece is capable of moving.

In yet another aspect, the present disclosure provides in some embodiments a master virtualization device, including: a first display circuit configured to project a first virtual image to a first predetermined position, and transmit projection data for projection of the first virtual image to a slave virtualization device; a first acquisition circuit configured to acquire an operational instruction for the first virtual image; an updating circuit configured to update the first virtual image in accordance with the operational instruction, to acquire a second virtual image; and a second display circuit configured to project the second virtual image to the first predetermined position, and transmit projection data for projection of the second virtual image to the slave virtualization device.

In a possible embodiment of the present disclosure, the first acquisition circuit includes at least one of: a first identification sub-circuit configured to identify an operational instruction given by a first user with respect to the first virtual image; or an acquisition sub-circuit configured to acquire an operational instruction transmitted by the slave virtualization device and given by a second user with respect to the first virtual image. The first user is a user of the master virtualization device, and the second user is a user of the slave virtualization device.

In a possible embodiment of the present disclosure, the first virtualization image includes a predetermined region. The first identification sub-circuit is further configured to: acquire displacement information about an object in the first virtual image moved by the first user; when the displacement information indicates that the first user has moved the object from a position outside the predetermined region to another position within the predetermined region, determine that the first user has given an object addition instruction with respect to the predetermined region; when the displacement information indicates that the first user has moved the object from a position within the predetermined region to another position outside the predetermined region, determine that the first user has given an object cancellation instruction with respect to the predetermined region; and when the displacement information indicates that the first user has moved the object from a position within the predetermined region to another position within the predetermined region, determine that the first user has given an object movement instruction with respect to the predetermined region.

In a possible embodiment of the present disclosure, the displacement information includes initial coordinate values and final coordinate values of the object relative to the predetermined region during the movement of the object by the first user.

In a possible embodiment of the present disclosure, a virtual chess board is formed at an entirety of the predetermined region, the object is a virtual chess piece, and the position is a point to which the virtual chess piece is capable of moving.

In still yet another aspect, the present disclosure provides in some embodiments a slave virtualization device, including: a third display circuit configured to acquire projection data that is for projection of a first virtual image and transmitted from the master virtualization device, and project the first virtual image to a second predetermined position in accordance with the projection data for the projection of the first virtual image; and a fourth display circuit configured to acquire projection data that is for projection of a second virtual image and transmitted from the master virtualization device, and project the second virtual image to the second predetermined position in accordance with the projection data for the projection of the second virtual image. The second virtual image is acquired by the master virtualization device through updating the first virtual image in accordance with an operational instruction for the first virtual image.

In a possible embodiment of the present disclosure, the slave virtualization device further includes: an identification circuit configured to identify an operational instruction given by a second user with respect to the first virtual image; and a transmission circuit configured to transmit, to the master virtualization device, the operational instruction that is for the first virtual image and given by the second user. The second user is a user of the slave virtualization device.

In a possible embodiment of the present disclosure, the first virtual image includes a predetermined region. The identification circuit includes a second identification sub-circuit configured to: acquire displacement information about an object in the first virtual image moved by the second user; when the displacement information indicates that the second user has moved the object from a position outside the predetermined region to a position within the predetermined region, determine that the second user has given an object addition instruction with respect to the predetermined region; when the displacement information indicates that the second user has moved the object from the position within the predetermined region to another position outside the predetermined region, determine that the second user has given an object cancellation instruction with respect to the predetermined region; and when the displacement information indicates that the second user has moved the object from the position within the predetermined region to another position within the predetermined region, determine that the second user has given an object movement instruction with respect to the predetermined region.

In a possible embodiment of the present disclosure, the displacement information includes initial coordinate values and final coordinate values of the object relative to the predetermined region during the movement of the object by the second user.

In still yet another aspect, the present disclosure provides in some embodiments an AR system, including the above-mentioned master virtualization device and at least one of the above-mentioned slave virtualization devices.

In still yet another aspect, the present disclosure provides in some embodiments a computer device, including a processor, a memory and a computer program stored in the memory and capable of being executed by the processor so as to implement the above-mentioned virtual image interaction method for use in the master virtualization device, or implement the above-mentioned virtual image interaction method for use in the slave virtualization device.

In still yet another aspect, the present disclosure provides in some embodiments a computer-readable storage medium storing therein a computer program which is executed by a processor so as to implement the above-mentioned virtual image interaction method for use in the master virtualization device, or implement the above-mentioned virtual image interaction method for use in the slave virtualization device.

BRIEF DESCRIPTION OF THE DRAWINGS

In order to illustrate the technical solutions of the present disclosure in a clearer manner, the drawings desired for the present disclosure will be described hereinafter briefly. It should be appreciated that, the following drawings merely relate to some embodiments of the present disclosure, and based on these drawings, a person skilled in the art may obtain the other drawings without any creative effort.

FIG. 3 is a flow chart of a virtual image interaction method for use in a slave virtualization device according to one embodiment of the present disclosure;

FIG. 4 is a schematic view showing the master virtualization device according to one embodiment of the present disclosure;

FIG. 5 is a schematic view showing the slave virtualization device according to one embodiment of the present disclosure;

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. In the following description, specific details of configurations and assemblies are merely provided to facilitate the understanding of the present disclosure. It should be appreciated that, a person skilled in the art may make further modifications and alternations without departing from the scope and the spirit of the present disclosure. In addition, for clarification and conciseness, any known function and structure will not be described hereinafter.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be appreciated that, the following serial numbers do not refer to the order of the steps. Actually, the order shall be determined in accordance with functions and internal logic of the steps, but shall not be construed as limiting the implementation in any form.

An object of the present disclosure is to provide a scheme for interactive enhanced display.

Figure 1:
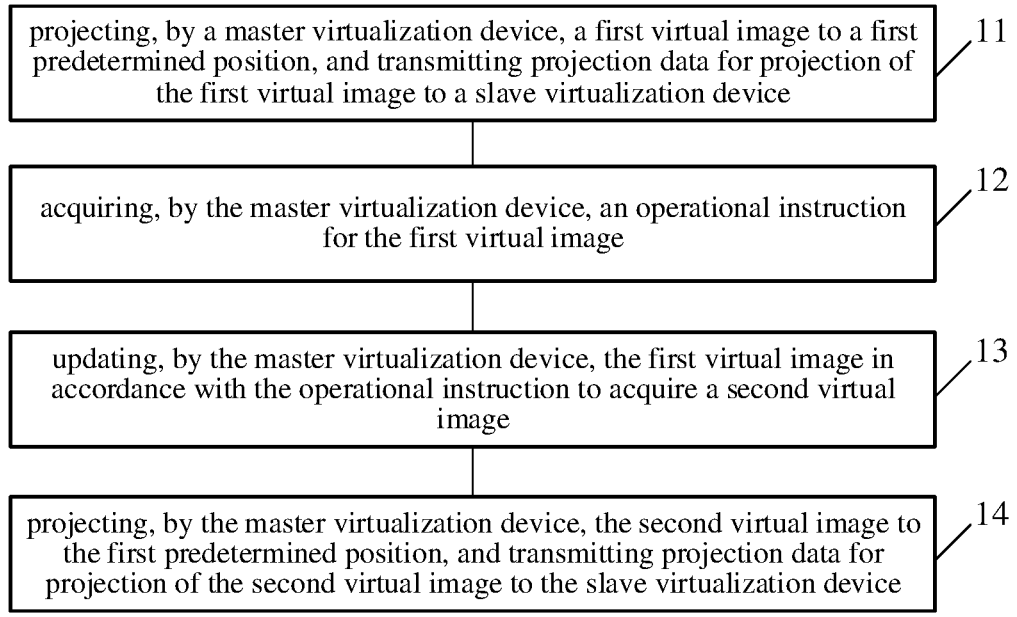
FIG. 1 is a flow chart of a virtual image interaction method for use in a master virtualization device according to one embodiment of the present disclosure.

The present disclosure provides in some embodiments a virtual image interaction method for use in a master virtualization device which, as shown in FIG. 1, includes the following steps.

Step 11: projecting, by the master virtualization device, a first virtual image to a first predetermined position, and transmitting projection data for projection of the first virtual image to a slave virtualization device. In this step, the first predetermined position may be a designated position where a screen for displaying the virtual image is located. A user of the master virtualization device may view the first virtual image at the first predetermined position. Alternatively, the first predetermined position may also be a position where eyes of the user of the master virtualization device are located, i.e., the master virtualization device may directly project the virtual image to the eyes. Upon the receipt of the projection data for projection of the first virtual image, the slave virtualization device may project the first virtual image for a user of the slave virtualization device, so as to display the first virtual image synchronously with the master virtualization device.

Step 12: acquiring, by the master virtualization device, an operational instruction for the first virtual image. The operational instruction may be an instruction instructing the user to make an operation on the first virtual image. The operation is associated with a software application for the virtualization device, and thus will not be particularly defined herein.

Step 13: updating, by the master virtualization device, the first virtual image in accordance with the operational instruction so as to acquire a second virtual image. The second virtual image is acquired after the operation has been made by the user on the first virtual image.

Step 14: projecting, by the master virtualization device, the second virtual image to the first predetermined position, and transmitting projection data for projection of the second virtual image to the slave virtualization device. Upon the receipt of the projection data for projection of the second virtual image, the slave virtualization device may project the second virtual image for a second user, so as to display the second virtual image synchronously with the master virtualization device.

According to the embodiments of the present disclosure, the master virtualization device acquires the operational instruction for the virtual images, generates and updates the projection data about the virtual image, and transmits the projection data to the slave virtualization device. As a result, it is able for the master virtualization device and the slave virtualization device to display the same virtual images in order, thereby to achieve the interactive AR application and facilitate the promotion of AR products.

To be specific, during the interactive AR application, both the user of the master virtualization device and the user of the slave virtualization device may perform the operations on the virtual image, so as to influence a scenario associated with the virtual image.

Hence, Step 12 of acquiring the operational instruction for the first virtual image may include: Step 121 of identifying, by the master virtualization device, an operational instruction given by a first user with respect to the first virtual image; and/or Step 122 of acquiring, by the master virtualization device, an operational instruction transmitted by the slave virtualization device and given by a second user with respect to the first virtual image. The second user is a user of the slave virtualization device. The slave virtualization device may identify the operational instruction for the first virtual image given by the second user.

The virtualization device provides the virtual image to the user in a one-to-one manner. When the virtual image is updated by each virtualization device in accordance with the respective operational instruction given by its own user, a conflict may occur and it is difficult to display the virtual image in a unified manner. Through the above design, the master virtualization device may receive the operational instructions identified by all the virtualization devices, and update the virtual image in accordance with these operational instructions in a unified manner. In this way, it is able for all the virtualization devices to display the same virtual image in response to the operational instruction given by any user.

The identification of the operational instruction for the virtual image will be described hereinafter in more details in conjunction with the embodiments.

For example, the virtual image interaction method is applied to an interactive chess application.

Step 121 of identifying, by the master virtualization device, the operational instruction for the first virtual image given by the first user may include: Step 1211 of acquiring, by the master virtualization device, displacement information about a virtual chess piece moved by the first user; Step 1212 of, when the displacement information indicates that the first user has moved the virtual chess piece from a position outside a virtual chess board to a point in the virtual chess board, determining, by the master virtualization device, that the first user has given a virtual chess piece addition instruction with respect to the virtual chess board; Step 1213 of, when the displacement information indicates that the first user has moved the virtual chess piece from the point in the virtual chess board to another position outside the virtual chess board, determining, by the master virtualization device, that the first user has given a virtual chess piece cancellation instruction with respect to the virtual chess board; and Step 1214 of, when the displacement information indicates that the first user has moved the virtual chess piece from the point in the virtual chess board to another point in the virtual chess piece, determining, by the master virtualization device, that the first user has given a virtual chess piece movement instruction with respect to the virtual chess board.

In actual use, the master virtualization device may project the virtual chess board onto a given screen for the first user, and establish a coordinate system so as to determine a range of the virtual chess board.

The displacement information may include initial coordinate values and final coordinate values of the virtual chess piece relative to the virtual chess board when the movement of the virtual chess piece made by the first user is captured by the master virtualization device through a camera.

Figure 2:
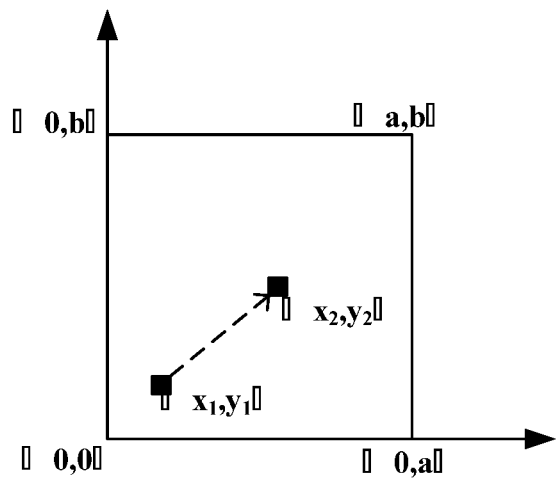
FIG. 2 is a schematic view showing the generation of displacement information when a virtual chess piece is moved by a user according to the interaction method provided by one embodiment of the present disclosure.

For example, as shown in FIG. 2, when the virtual chess board is of a square, a rectangular coordinate system may be established with one corner as an origin (0,0), and coordinates of a corner arranged diagonally opposite to the origin (0,0) may be (a,b).

When the virtual chess piece is moved by the first user from $(x_1,y_1)$ to $(x_2,y_2)$, the generated displacement information may be $(w_1,n_1)$ and $(w_2,n_2)$, where $w_1=x_1/a$, $n_1=y_1/b$, $w_2=x_2/a$, and $n_2=y_2/b$.

The displacement information acquired by all the virtualization devices refers to the displacement of the virtual chess piece relative to the virtual chess board (or the screen), so as to ensure the coherence of the operational instructions identified by the virtualization devices with respect to the virtual chess board.

It should be appreciated that, through the initial coordinate values and the final coordinate values of the virtual chess piece, it is able to determine whether a start position and a final position of the virtual chess piece are located in the virtual chess board. The points in the virtual chess board where the virtual chess piece is to move are determined, so through the virtual image interaction method in the embodiments of the present disclosure, it is able to determine a relationship between the virtual chess piece and the points, thereby to identify the virtual chess piece movement instruction and the virtual chess piece cancellation instruction.

The present disclosure further provides in some embodiments a virtual image interaction method for use in a slave virtualization device which, as shown in FIG. 3, includes the following steps.

Step 31: acquiring, by the slave virtualization device, projection data for projection of a first virtual image from a master virtualization device, and projecting the first virtual image to a second predetermined position in accordance with the projection data for projection of the first virtual image. In this step, the second predetermined position may be a designated position where a screen for displaying the virtual image is located, and a user of the slave virtualization device may view the first virtual image at the second predetermined position. Alternatively, the second predetermined position may also be a position where an eye of the user of the slave virtualization device is located, i.e., the slave virtualization device may directly project the virtual image to the eyes.

Step 32: acquiring, by the slave virtualization device, projection data for projection of a second virtual image from the master virtualization device, and projecting the second virtual image to the second predetermined position in accordance with the projection data for projection of the second virtual image. The second virtual image is acquired by the master virtualization device through updating the first virtual image in accordance with an operational instruction for the first virtual image.

It should be appreciated that, according to the embodiments of the present disclosure, the slave virtualization device may acquire the projection data from the master virtualization device. As a result, it is able for the slave virtualization device to display the virtual image synchronously with the master virtualization device, thereby to achieve the interactive AR application and facilitate the promotion of AR products.

To be specific, during the interactive AR application, both the user of the master virtualization device and the user of the slave virtualization device may perform the operations on the virtual image, so as to influence a scenario associated with the virtual image.

Hence, based on the above, the virtual image interaction method may further include: Step 33 of identifying, by the slave virtualization device, an operational instruction given by a second user with respect to the first virtual image, the second user being a user of the slave virtualization device; and Step 34 of transmitting, by the slave virtualization device, the operational instruction for the first virtual image given by the second user to the master virtualization device.

The virtualization device provides the virtual image to the user in a one-to-one manner. When the virtual image is updated by each virtualization device in accordance with the respective operational instruction given by its own user, a conflict may occur and it is difficult to display the virtual image in a unified manner. Through the above design, the master virtualization device may receive the operational instructions identified by all the virtualization devices, and update the virtual image in accordance with these operational instructions in a unified manner. In this way, it is able for all the virtualization devices to display the same virtual image in response to the operational instruction given by any user.

In the above Step 33, a principle of identifying, by the slave virtualization device, the operational instruction for the first virtual image given by the second user is the same as that of identifying, by the master virtualization device, the operational instruction for the first virtual image given by the first user mentioned hereinabove.

When the first virtual image is a virtual chess board, Step 33 may include: Step 331 of acquiring, by the slave virtualization device, displacement information about a virtual chess piece moved by the second user; Step 332 of, when the displacement information indicates that the second user has moved the virtual chess piece from a position outside the virtual chess board to a point in the virtual chess board, determining, by the slave virtualization device, that the second user has given a virtual chess piece addition instruction with respect to the virtual chess board; Step 333 of, when the displacement information indicates that the second user has moved the virtual chess piece from the point in the virtual chess board to another position outside the virtual chess board, determining, by the slave virtualization device, that the second user has given a virtual chess piece cancellation instruction with respect to the virtual chess board; and Step 334 of, when the displacement information indicates that the second user has moved the virtual chess piece from the point in the virtual chess board to another point in the virtual chess board, determining, by the slave virtualization device, that the second user has given a virtual chess piece movement instruction with respect to the virtual chess board.

Correspondingly, the displacement information about the virtual chess piece moved by the second user may also include initial coordinate values and final coordinate values of the virtual chess piece relative to the virtual chess board during the movement of the virtual chess piece by the second user. The principle has been described hereinbefore, and thus will not be particularly defined herein.

The present disclosure further provides in some embodiments a master virtualization device which, as shown in FIG. 4, includes: a first display module 41 configured to project a first virtual image for a first user of the primary virtualization device, and transmit projection data for projection of the first virtual image to a slave virtualization device; a first acquisition module 42 configured to acquire an operational instruction for the first virtual image; an updating module 43 configured to update the first virtual image in accordance with the operational instruction, so as to acquire a second virtual image; and a second display module 44 configured to project the second virtual image to the first user, and transmit projection data for projection of the second virtual image to the slave virtualization device.

It should be appreciated that, the master virtualization device may be applied to implement the above-mentioned virtual image interaction method with a same technical effect, and thus will not be particularly defined herein.

In a possible embodiment of the present disclosure, the first acquisition module 42 includes: a first identification unit configured to identify an operational instruction given by a first user with respect to the first virtual image; and/or an acquisition unit configured to acquire an operational instruction transmitted by the slave virtualization device and given by a second user with respect to the first virtual image.

In a possible embodiment of the present disclosure, the first virtualization image includes a virtual chess board. The first identification unit is further configured to: acquire displacement information about a virtual chess piece moved by the first user; when the displacement information indicates that the first user has moved the virtual chess piece from a position outside the virtual chess board to a point in the virtual chess board, determine that the first user has given a virtual chess piece addition instruction with respect to the virtual chess board; when the displacement information indicates that the first user has moved the virtual chess piece from the point in the virtual chess board to another position outside the virtual chess board, determine that the first user has given a virtual chess piece cancellation instruction with respect to the virtual chess board; and when the displacement information indicates that the first user has moved the virtual chess piece from the point in the virtual chess board to another point in the virtual chess board, determine that the first user has given a virtual chess piece movement instruction with respect to the virtual chess board.

In a possible embodiment of the present disclosure, the displacement information includes initial coordinate values and final coordinate values of the virtual chess piece relative to the virtual chess board during the movement of the virtual chess piece by the first user.

The present disclosure further provides in some embodiments a slave virtualization device which, as shown in FIG. 5, includes: a third display module 51 configured to acquire projection data for projection of a first virtual image from a master virtualization device, and project the first virtual image to a second user in accordance with the projection data for projection of the first virtual image; and a fourth display module 52 configured to acquire projection data for projection of a second virtual image from the master virtualization device, and project the second virtual image to the second user in accordance with the projection data for projection of the second virtual image. The second virtual image is acquired by the master virtualization device through updating the first virtual image in accordance with an operational instruction for the first virtual image.

It should be appreciated that, the slave virtualization device may be applied to implement the above-mentioned virtual image interaction method with a same technical effect, and thus will not be particularly defined herein.

In a possible embodiment of the present disclosure, the slave virtualization device further includes: an identification module configured to identify an operational instruction for the first virtual image given by the second user; and a transmission module configured to transmit the operational instruction for the first virtual image given by the second user to the master virtualization device.

Illustratively, when the first virtual image includes a virtual chess board, the identification module may include a second identification unit configured to: acquire displacement information about a virtual chess piece moved by the second user; when the displacement information indicates that the second user has moved the virtual chess piece from a position outside the virtual chess board to a point in the virtual chess board, determine that the second user has given a virtual chess piece addition instruction with respect to the virtual chess board; when the displacement information indicates that the second user has moved the virtual chess piece from the point in the virtual chess board to a position outside the virtual chess board, determine that the second user has given a virtual chess piece cancellation instruction with respect to the virtual chess board; and when the displacement information indicates that the second user has moved the virtual chess piece from the point in the virtual chess board to another point in the virtual chess board, determine that the second user has given a virtual chess piece movement instruction with respect to the virtual chess board.

In a possible embodiment of the present disclosure, the displacement information includes initial coordinate values and final coordinate values of the virtual chess piece relative to the virtual chess board during the movement of the virtual chess piece by the second user.

The present disclosure further provides in some embodiments an AR system including one above-mentioned master virtualization device and one or more above-mentioned slave virtualization devices.

It should be appreciated that, according to the AR system in the embodiments of the present disclosure, the interaction of the virtual image may be achieved between the master virtualization device and the slave virtualization device. The master virtualization device may acquire the operational instruction for the virtual image, generate and update the projection data about the virtual image, and transmit the projection data to the slave virtualization device. As a result, it is able for the master virtualization device and the slave virtualization device to display the same virtual image in order, thereby to achieve the interactive AR application.

An operating procedure of the AR system will be described hereinafter in more details in conjunction with a specific scenario.

Figure 6:
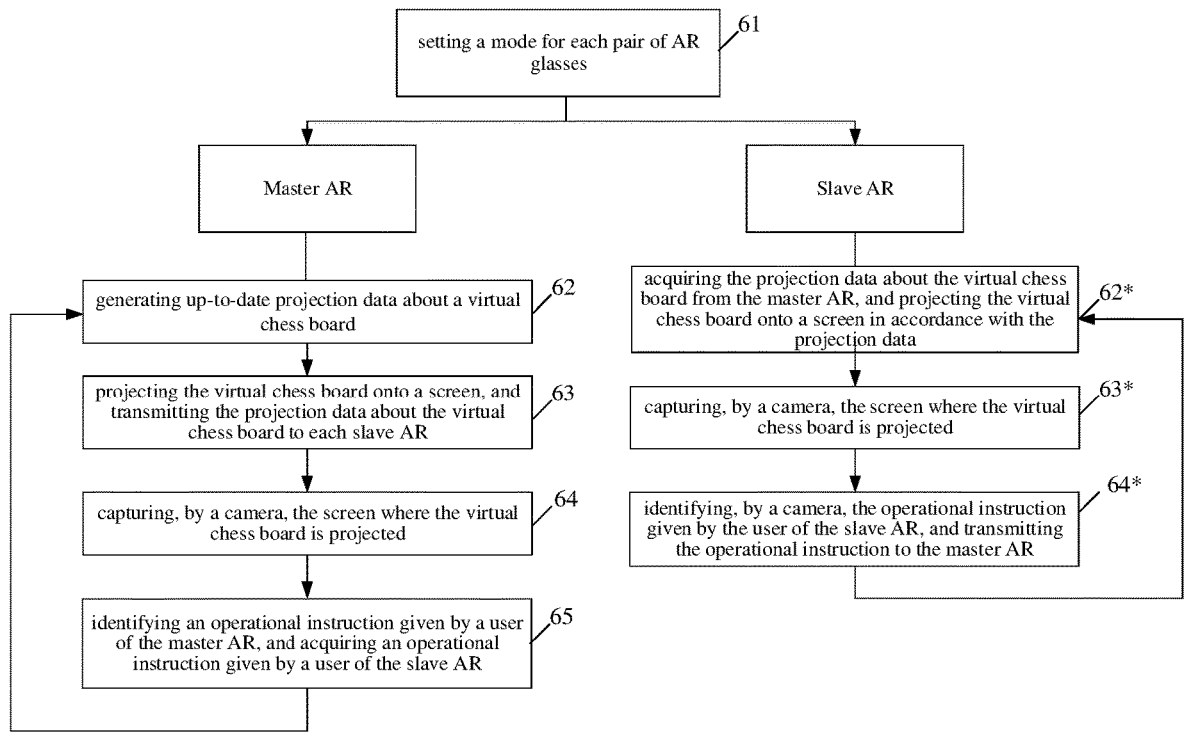
FIG. 6 is a schematic view showing an operating procedure of an AR system according to one embodiment of the present disclosure.

As shown in FIG. 6, the master virtualization device and the slave virtualization device of the AR system are each a pair of AR glasses, and data interaction is performed between the pairs of AR glasses via a wireless network.

Taking an interactive chess application as an example, the operating procedure of the AR system may include the following steps.

Step 61: setting a mode for each pair of AR glasses, i.e., designating one pair of AR glasses as a master AR and designating the others as slave ARs.

An operating procedure of the master AR may include: Step 62 of generating up-to-date projection data about a virtual chess board; Step 63 of projecting the virtual chess board onto a screen, and transmitting the projection data about the virtual chess board to each slave AR; Step 64 of capturing, by a camera, the screen where the virtual chess board has been projected, so as to detect movement information about a virtual chess piece; and Step 65 of identifying an operational instruction of a user of the master AR (in accordance with the movement information about the virtual chess piece detected in Step 61), acquiring an operational instruction given by a respective user of each slave AR, and returning to Step 62.

An operating procedure of each slave AR may include: Step 62* of acquiring the projection data about the virtual chess board from the master AR, and projecting the virtual chess board onto a screen in accordance with the projection data; Step 63* of capturing, by a camera, the screen where the virtual chess board has been projected, so as to detect movement information about the virtual chess piece; and Step 64* of identifying an operational instruction given by a user of the slave AR (in accordance with the movement information about the virtual chess piece detected in Step 63*), transmitting the operational instruction to the master AR, and returning to Step 62*.

Figure 7:
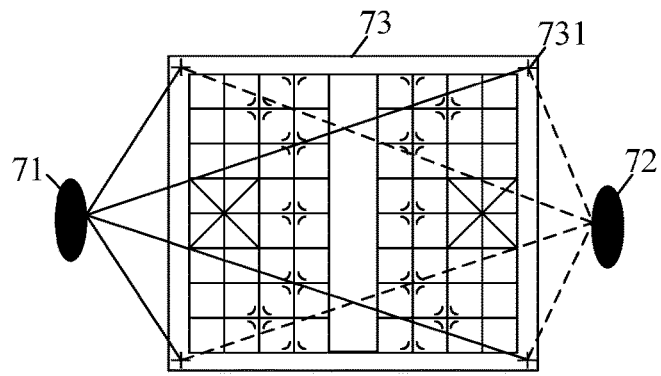
FIG. 7 is a schematic view showing an effect of an interactive virtual chess application implemented by the AR system according to one embodiment of the present disclosure.

In actual use, as shown in FIG. 7, the master virtualization device 71 and the slave virtualization device 72 correspond to the same screen 73. Based on the above procedures, both the master virtualization device 71 and the slave virtualization device 72 are capable of accurately projecting an image of the virtual chess board onto the screen 73 in accordance with a positioning mark 731 of the screen 73, so it is able for the first user and the second user to play chess in an interactive and virtual manner.

Figure 8:
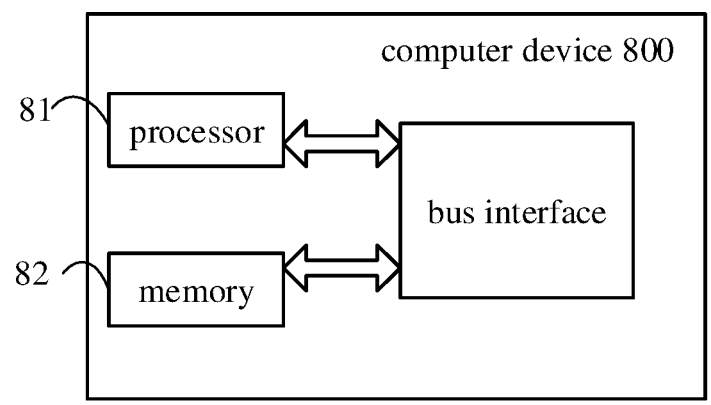
FIG. 8 is a schematic view showing a computer device according to one embodiment of the present disclosure.

The present disclosure further provides in some embodiments a computer device 800 which, as shown in FIG. 8, includes a processor 81, a memory 82 and a computer program stored in the memory 82 and capable of being executed by the processor 81.

Data interaction may be performed between the processor 81 and the memory 82 through a bus interface. The bus interface may include a number of buses and bridges connected to each other, so as to connect various circuits for one or more processors such as the processor 81 and one or more memories such as the memory 82. In addition, bus architecture may be used to connect any other circuits, such as a circuit for a peripheral device, a circuit for a voltage stabilizer and a power management circuit.

When the computer device 800 is a master virtualization device, the processor 81 may read the computer program stored in the memory 82, so as to: project a first virtual image to a first user of the master virtualization device, and transmit projection data for projection of the first virtual image to a slave virtualization device; acquire an operational instruction for the first virtual image; update the first virtual image in accordance with the operational instruction so as to acquire a second virtual image; and project the second virtual image for the first user, and transmit projection data for projection of the second virtual image to the slave virtualization device.

In a possible embodiment of the present disclosure, the processor 81 may be further configured to read the computer program in the memory 82, so as to acquire the operational instruction for the first virtual image including: identifying an operational instruction for the first virtual image given by the first user, and/or acquiring an operational instruction transmitted by the slave virtualization device and given by a second user with respect to the first virtual image of the slave virtualization device.

The first virtual image includes a virtual chess board. The processor 81 may be further configured to read the computer program in the memory 82, so as to identify the operational instruction for the first virtual image given by the first user including: acquiring displacement information about a virtual chess piece moved by the first user; when the displacement information indicates that the first user has moved the virtual chess piece from a position outside the virtual chess board to a point in the virtual chess board, determining that the first user has given a virtual chess piece addition instruction with respect to the virtual chess board; when the displacement information indicates that the first user has moved the virtual chess piece from the point in the virtual chess board to a position outside the virtual chess board, determining that the first user has given a virtual chess piece cancellation instruction with respect to the virtual chess board; and when the displacement information indicates that the first user has moved the virtual chess piece from the point in the virtual chess board to another point in the virtual chess board, determining that the first user has given a virtual chess piece movement instruction with respect to the virtual chess board.

In a possible embodiment of the present disclosure, the displacement information includes initial coordinate values and final coordinate values of the virtual chess piece relative to the virtual chess board during the movement of the virtual chess piece by the first user.

When the computer device 800 is a slave virtualization device, the processor 81 may be further configured to read the computer program in the memory 82, so as to: acquire projection data for projection of a first virtual image from a master virtualization device, and project the first virtual image for the second user in accordance with the projection data for projection of the first virtual image; and acquire projection data for projection of a second virtual image from the master virtualization device, and project the second virtual image for the second user in accordance with the projection data for projection of the second virtual image. The second virtual image is acquired by the master virtualization device through updating the first virtual image in accordance with an operational instruction for the first virtual image.

In a possible embodiment of the present disclosure, the processor 81 may be further configured to read the computer program in the memory 82, so as to identify an operational instruction for the first virtual image given by the second user, and transmit the operational instruction for the first virtual image given by the second user to the master virtualization device.

In a possible embodiment of the present disclosure, the first virtual image includes a virtual chess board. The processor 81 may be further configured to read the computer program in the memory 82, so as to identify the operational instruction for the first virtual image given by the second user including: acquiring displacement information about a virtual chess piece moved by the second user; when the displacement information indicates that the second user has moved the virtual chess piece from a position outside the virtual chess board to a point in the virtual chess board, determining that the second user has given a virtual chess piece addition instruction with respect to the virtual chess board; when the displacement information indicates that the second user has moved the virtual chess piece from the point in the virtual chess board to a position outside the virtual chess board, determining that the second user has given a virtual chess piece cancellation instruction with respect to the virtual chess board; and when the displacement information indicates that the second user has moved the virtual chess piece from the point in the virtual chess board to another point in the virtual chess board, determine that the second user has given a virtual chess piece movement instruction with respect to the virtual chess board.

In a possible embodiment of the present disclosure, the displacement information includes initial coordinate values and final coordinate values of the virtual chess piece relative to the virtual chess board during the movement of the virtual chess piece by the second user.

The present disclosure further provides in some embodiments a computer-readable storage medium storing therein a computer program.

The computer program stored in the computer-readable storage medium is capable of being executed by a master virtualization device, so as to: project a first virtual image for a first user of the master virtualization device, and transmit projection data for projection of the first virtual image to a slave virtualization device; acquire an operational instruction for the first virtual image; update the first virtual image in accordance with the operational instruction so as to acquire a second virtual image; and project the second virtual image for the first user, and transmit projection data for projection of the second virtual image to the slave virtualization device.

In a possible embodiment of the present disclosure, the computer program stored in the computer-readable storage medium is capable of being executed by the processor of the master virtualization device, so as to acquire the operational instruction for the first virtual image including: identifying an operational instruction for the first virtual image given by the first user; and/or acquiring an operational instruction transmitted by the slave virtualization device and given by a second user with respect to the first virtual image of the slave virtualization device.

In a possible embodiment of the present disclosure, the first virtual image includes a virtual chess board. The computer program stored in the computer-readable storage medium is capable of being executed by the processor, so as to identify the operational instruction for the first virtual image given by the first user including: acquiring displacement information about a virtual chess piece moved by the first user; when the displacement information indicates that the first user has moved the virtual chess piece from a position outside the virtual chess board to a point in the virtual chess board, determining that the first user has given a virtual chess piece addition instruction with respect to the virtual chess board; when the displacement information indicates that the first user has moved the virtual chess piece from the point in the virtual chess board to a position outside the virtual chess board, determining that the first user has given a virtual chess piece cancellation instruction with respect to the virtual chess board; and when the displacement information indicates that the first user has moved the virtual chess piece from the point in the virtual chess board to another point in the virtual chess board, determining that the first user has given a virtual chess piece movement instruction with respect to the virtual chess board.

The computer program stored in the computer-readable storage medium is capable of being executed by a processor of the slave virtualization device, so as to: acquire projection data for projection of a first virtual image from a master virtualization device, and project the first virtual image to the second user in accordance with the projection data for projection of the first virtual image; and acquire projection data for projection of a second virtual image from the master virtualization device, and project the second virtual image to the second user in accordance with the projection data for projection of the second virtual image. The second virtual image is acquired by the master virtualization device through updating the first virtual image in accordance with an operational instruction for the first virtual image.

In a possible embodiment of the present disclosure, the computer program stored in the computer-readable storage medium is capable of being executed by the processor of the slave virtualization device, so as to: identify an operational instruction for the first virtual image given by the second user; and transmit the operational instruction for the first virtual image given by the second user to the master virtualization device.

In a possible embodiment of the present disclosure, the first virtual image includes a virtual chess board. The computer program stored in the computer-readable storage medium is capable of being executed by the processor of the slave virtualization device, so as to identify an operational instruction for the first virtual image given by the second user including: acquiring displacement information about a virtual chess piece moved by the second user; when the displacement information indicates that the second user has moved the virtual chess piece from a position outside the virtual chess board to a point in the virtual chess board, determining that the second user has given a virtual chess piece addition instruction with respect to the virtual chess board; when the displacement information indicates that the second user has moved the virtual chess piece from the point in the virtual chess board to a position outside the virtual chess board, determining that the second user has given a virtual chess piece cancellation instruction with respect to the virtual chess board; and when the displacement information indicates that the second user has moved the virtual chess piece from the point in the virtual chess board to another point in the virtual chess board, determining that the second user has given a virtual chess piece movement instruction with respect to the virtual chess board.

In a possible embodiment of the present disclosure, the displacement information includes initial coordinate values and final coordinate values of the virtual chess piece relative to the virtual chess board during the movement of the virtual chess piece by the second user.

The functional members described in the specification may be referred to as modules or units, so as to emphasize the independence of the implementation in a more particular manner.

In the embodiments of the present disclosure, each of the modules and units may be implemented by software, so as to be executed by various processors. For example, an identified, executable code module or unit may include one or more physical or logical blocks including computer instructions, and the module or unit may be constructed as an object, a process or a function. Even so, the executable codes of the identified module or unit are unnecessary to be physically located together, but may include different instructions stored at different physical locations. When these instructions are logically combined together, they may form the module or unit and achieve the prescribed purposes of the module or unit.

Actually, the executable code module or unit may be a single instruction or a plurality of instructions, and may even be distributed at different code segments, in different programs, or across a plurality of memory devices. Also, operational data may be identified in the module or unit, implemented in any appropriate form, and organized in any data structure of an appropriate type. The operational data may be collected as a single data set, or distributed at different locations (including different memory devices), and may be at least partially present in a system or network merely as an electronic signal.

Alternatively, each of the module or unit may also be implemented through a corresponding hardware circuit. The hardware circuit may include a very-large-scale integration (VLSI) circuit, a gate array, a semiconductor device such as a logic chip or a transistor, or other discrete components in the related art. The module or unit may further be implemented by a programmable hardware device, such as a field-programmable gate array, a programmable array logic device or a programmable logic device.

The above embodiments are for illustrative purposes only, but the present disclosure is not limited thereto. It should be appreciated that, a person skilled in the art may make further modifications and improvements without departing from the spirit of the present disclosure, and these modifications and improvements shall also fall within the scope of the present disclosure.

Unless otherwise defined, any technical or scientific term used herein shall have the common meaning understood by a person of ordinary skills. Such words as "include" or "including" intends to indicate that an element or object before the word contains an element or an object or an equivalent thereof listed after the word, without excluding any other element or object or equivalent.

What is claimed is:

1. A virtual image interaction method for use in a master Augmented Reality (AR) device and at least one slave AR device, comprising:
   projecting, by the master AR device a first virtual image to a first predetermined position, and transmitting, by the master AR device projection data for projection of the first virtual image to the slave AR device;
   acquiring, by the slave AR device, the projection data for the projection of the first virtual image transmitted from the master AR device, and projecting, by the slave AR device when the master AR device projects the first virtual image to the first predetermined position, the first virtual image to a second predetermined position in accordance with the projection data for the projection of the first virtual image;
   acquiring, by the master AR device an operational instruction for the first virtual image from at least one of the first user and a second user, wherein the first user is a user of the master AR device, and the second user is a user of the slave AR device;
   updating, by the master AR device, the first virtual image in accordance with the operational instruction, to acquire a second virtual image; and
   projecting, by the master AR device, the second virtual image to the first predetermined position, and transmitting projection data for projection of the second virtual image to the slave AR device; and
   acquiring, by the slave AR device, the projection data for the projection of the second virtual image transmitted from the master AR device, and projecting, by the slave AR device when the master AR device projects the second virtual image to the first predetermined position, the second virtual image to the second predetermined position in accordance with the projection data for the projection of the second virtual image.

2. The virtual image interaction method according to claim 1, wherein acquiring, by the master AR device, the operational instruction for the first virtualization image from at least one of the first user and the second user comprises at least one of:
   identifying, by the master AR device, the operational instruction given by the first user with respect to the first virtual image; and
   acquiring, by the master AR device, the operational instruction transmitted by the slave AR device and given by the second user with respect to the first virtual image.

3. The virtual image interaction method according to claim 2, wherein the first virtual image comprises a predetermined region, and identifying, by the master AR device, the operational instruction given by the first user with respect to the first virtual image comprises:
   acquiring, by the master AR device, displacement information about an object in the first virtual image moved by the first user;
   when the displacement information indicates that the first user has moved the object from a position outside the predetermined region to another position within the predetermined region, determining, by the master AR device, that the first user has given an object addition instruction with respect to the predetermined region;

when the displacement information indicates that the first user has moved the object from a position within the predetermined region to another position outside the predetermined region, determining, by the master AR device, that the first user has given an object cancellation instruction with respect to the predetermined region; and when the displacement information indicates that the first user has moved the object from a position within the predetermined region to another position within the predetermined region, determining, by the master AR device, that the first user has given an object movement instruction with respect to the predetermined region.

4. The virtual image interaction method according to claim 3, wherein the displacement information comprises initial coordinate values and final coordinate values of the object relative to the predetermined region during the movement of the object by the first user.

5. The virtual image interaction method according to claim 3, wherein a virtual chess board is formed at an entirety of the predetermined region, the object is a virtual chess piece, and the position is a point to which the virtual chess piece is capable of moving.

6. The virtual image interaction method according to claim 1, further comprising: before the master AR device acquires the operational instruction for the first virtual image from at least one of the first user and the second user, identifying, by the slave AR device, the operational instruction given by the second user with respect to the first virtual image; and transmitting, by the slave AR device to the master AR device, the operational instruction that is for the first virtual image and given by the second user.

7. The virtual image interaction method according to claim 6, wherein the first virtual image comprises a predetermined region, and identifying, by the slave AR device, the operational instruction given by the second user with respect to the first virtual image comprises:

acquiring, by the slave AR device, displacement information about an object in the first virtual image moved by the second user;

when the displacement information indicates that the second user has moved the object from a position outside the predetermined region to another position within the predetermined region, determining, by the slave AR device, that the second user has given an object addition instruction with respect to the predetermined region;

when the displacement information indicates that the second user has moved the object from a position within the predetermined region to another position outside the predetermined region, determining, by the slave AR device, that the second user has given an object cancellation instruction with respect to the predetermined region; and when the displacement information indicates that the second user has moved the object from a position within the predetermined region to another position within the predetermined region, determining, by the slave AR device, that the second user has given an object movement instruction with respect to the predetermined region.

8. The virtual image interaction method according to claim 7, wherein the displacement information comprises initial coordinate values and final coordinate values of the object relative to the predetermined region during the movement of the object by the second user.

9. The virtual image interaction method according to claim 7, wherein a virtual chess board is formed at an entirety of the predetermined region, the object is a virtual chess piece, and the position is a point to which the virtual chess piece is capable of moving.

10. An AR system, comprising a master AR device and at least one slave AR device, wherein the master AR device comprises:

a first display circuit configured to project a first virtual image to a first predetermined position, and transmit projection data for projection of the first virtual image to the slave AR device;

a first acquisition circuit configured to acquire an operational instruction for the first virtual image from at least one of a first user and a second user, wherein the first user is a user of the master AR device, and the second user is a user of the slave AR device;

an updating circuit configured to update the first virtual image in accordance with the operational instruction, to acquire a second virtual image; and a second display circuit configured to project the second virtual image to the first predetermined position, and transmit projection data for projection of the second virtual image to the slave AR device; and the slave AR device comprises:

a third display circuit configured to acquire the projection data for the projection of the first virtual image transmitted from the first display circuit, and project, when the first display circuit projects the first virtual image to the first predetermined position, the first virtual image to a second predetermined position in accordance with the projection data for the projection of the first virtual image; and a fourth display circuit configured to acquire the projection data for the projection of the second virtual image transmitted from the second display circuit, and project, when the second display circuit projects the second virtual image to the first predetermined position, the second virtual image to the second predetermined position in accordance with the projection data for the projection of the second virtual image.

11. The AR system according to claim 10, wherein the first acquisition circuit comprises at least one of:

a first identification sub-circuit configured to identify the operational instruction given by the first user with respect to the first virtual image; and an acquisition sub-circuit configured to acquire the operational instruction transmitted by the slave AR device and given by the second user with respect to the first virtual image.

12. The AR system according to claim 11, wherein the first virtualization image comprises a predetermined region, and the first identification sub-circuit is further configured to:

acquire displacement information about an object in the first virtual image moved by the first user;

when the displacement information indicates that the first user has moved the object from a position outside the predetermined region to another position within the predetermined region, determine that the first user has given an object addition instruction with respect to the predetermined region;

when the displacement information indicates that the first user has moved the object from a position within the predetermined region to another position outside the predetermined region, determine that the first user has given an object cancellation instruction with respect to the predetermined region; and when the displacement information indicates that the first user has moved the object from a position within the predetermined region to another position within the predetermined region, determine that the first user has given an object movement instruction with respect to the predetermined region.

13. The AR system according to claim 12, wherein the displacement information comprises initial coordinate values and final coordinate values of the object relative to the predetermined region during the movement of the object by the first user.

14. The AR system according to claim 12, wherein a virtual chess board is formed at an entirety of the predetermined region, the object is a virtual chess piece, and the position is a point to which the virtual chess piece is capable of moving.

15. The AR system according to claim 10, wherein the slave AR device further comprises:

an identification circuit configured to identify the operational instruction given by the second user with respect to the first virtual image; and a transmission circuit configured to transmit, to the master AR device, the operational instruction that is for the first virtual image and given by the second user.

16. The AR system according to claim 15, wherein the first virtual image comprises a predetermined region, and the identification circuit comprises a second identification sub-circuit configured to:

acquire displacement information about an object in the first virtual image moved by the second user;

when the displacement information indicates that the second user has moved the object from a position outside the predetermined region to another position within the predetermined region, determine that the second user has given an object addition instruction with respect to the predetermined region;

when the displacement information indicates that the second user has moved the object from a position within the predetermined region to another position outside the predetermined region, determine that the second user has given an object cancellation instruction with respect to the predetermined region; and when the displacement information indicates that the second user has moved the object from a position within the predetermined region to another position within the predetermined region, determine that the second user has given an object movement instruction with respect to the predetermined region.

17. The AR system according to claim 16, wherein the displacement information comprises initial coordinate values and final coordinate values of the object relative to the predetermined region during the movement of the object by the second user.

18. The AR system according to claim 16, wherein a virtual chess board is formed at an entirety of the predetermined region, the object is a virtual chess piece, and the position is a point to which the virtual chess piece is capable of moving.

* * * * *